(12) United States Patent
Welker

(10) Patent No.: US 8,085,620 B2
(45) Date of Patent: Dec. 27, 2011

(54) DETERMINING A POSITION OF A SURVEY RECEIVER IN A BODY OF WATER

(75) Inventor: Kenneth E. Welker, Nesoya (NO)

(73) Assignee: WesternGeco L.L.C., Houston, TX (US)

( * ) Notice: Subject to any disclaimer, the term of this patent is extended or adjusted under 35 U.S.C. 154(b) by 293 days.

(21) Appl. No.: 12/413,471

(22) Filed: Mar. 27, 2009

(65) Prior Publication Data

US 2010/0246322 A1 Sep. 30, 2010

(51) Int. Cl.
*G01V 1/38* (2006.01)
(52) U.S. Cl. .......................... 367/124; 367/15
(58) Field of Classification Search .................. 367/15, 367/19, 124, 129
See application file for complete search history.

(56) References Cited

U.S. PATENT DOCUMENTS

| | | | |
|---|---|---|---|
| 6,256,264 | B1 | 7/2001 | Beckman et al. |
| 6,625,083 | B2 * | 9/2003 | Vandenbroucke ............... 367/15 |
| 7,203,130 | B1 | 4/2007 | Welker |
| 7,286,442 | B2 * | 10/2007 | Ray et al. ........................ 367/15 |
| 2008/0008045 | A1 | 1/2008 | Basilico |
| 2008/0253225 | A1 | 10/2008 | Welker et al. |

OTHER PUBLICATIONS

At-Sea Cable Lay Monitoring and Control System—An Introduction, MakaiLay.com, Aug. 7, 2008.
Submarine Cable Management Software, MakaiLay Brochure, 2008.
Ultra-Short Baseline, Wikipidea, 2008.
Kalman Filter, Wikipedia, 2008.
Chu, et al, Prediction of Falling Cylinder Through Air-Water-Sediment Columns, Transactions of the ASME, Mar. 2006, pp. 300-314, vol. 73.
Chu, et al Pseudocylinder Parametrization for Mine Impact Burial Prediction, Journal of Fluids Engineering, Nov. 2005, pp. 1215-1220, vol. 127.
Chu, et al., Mine-Impact Burial Model(IMPACT35) Verification and Improvement Using Sediment Bearing Factor Method, IEEE Journal of Oceanic Engineering, Jan. 2007, vol. 32, No. 1, pp. 34-48.
Chu, et al, Triple Coordinate Transforms for Prediction of Falling Cylinder through the Water Column, Journal of Applied Mechanics, Mar. 2004, pp. 292-298, vol. 71.
Chu, et al., Experiment of Falling Cylinder through the Water Column, Experimental and Thermal Fluid Science, 2005, pp. 555-568, vol. 29.
Chu, el al., Prediction of High Speed Rigid Body Maneuvering in Air-water-Sediment Columns, Advances in Fluid Mechanics, 2006, pp. 123-132, vol. 6.
Chu, et al., Underwater Bomb Trajectory Prediction for Stand-Off Assault (Mine/IED) Breaching Weapon Fuse Improvement, Eighth Monterey International Symposium on Technology and Mine Problems, NPS, Monterey, California, May 5-7, 2008.
PCT Search Report, dated Oct. 13, 2010, Application No. PCT/US2010/028489.

\* cited by examiner

*Primary Examiner* — Ian Lobo
(74) *Attorney, Agent, or Firm* — Dan C. Hu; Kevin P. McEnaney; Kevin B. McGoff

(57) ABSTRACT

To determine a position of a survey receiver used to measure a response of a subterranean structure to a survey signal, positions of the survey receiver as the survey receiver descends in a body of water to a surface are received from an acoustic ranging system. Measurement information associated with movement of the survey receiver is received from at least one sensor. Based on the measurement information from the acoustic ranging system and the at least one sensor, the position of the survey receiver at the surface once the survey receiver has reached the surface is computed.

19 Claims, 4 Drawing Sheets

DETERMINING A POSITION OF A SURVEY RECEIVER IN A BODY OF WATER

TECHNICAL FIELD

The invention relates generally to determining a position of a survey receiver in a body of water based on measurements from multiple sources.

BACKGROUND

Surveying is used for identifying subterranean elements, such as hydrocarbon reservoirs, freshwater aquifers, gas injection reservoirs, and so forth. Surveying can include seismic surveying or electromagnetic (EM) surveying. In seismic surveying, seismic sources are placed in various locations above an earth surface or sea floor, with the seismic sources activated to generate seismic waves directed into the subterranean structure.

The seismic waves generated by a seismic source travel into the subterranean structure, with a portion of the seismic waves reflected back to the surface for receipt by seismic receivers (e.g., geophones, hydrophones, etc.). These seismic receivers produce signals that represent detected seismic waves. Signals from seismic receivers are processed to yield information about the content and characteristic of the subterranean structure.

EM surveying involves deployment of one or more EM sources that produce EM waves that are propagated into the subterranean structure. EM signals are affected by elements in the subterranean structure, and the affected signals are detected by EM receivers, which are then processed to yield information about the content and characteristic of the subterranean structure.

Surveying of a subterranean structure can be performed in a marine environment, in which a marine vessel tows survey sources (e.g., EM sources or seismic sources) for generating survey signals to perform the survey. In many implementations, the survey receivers for measuring responses of the subterranean structure to the survey signals are dropped to the water bottom surface (e.g., sea floor). The survey receivers are dropped from the marine vessel into the body of water to reach the water bottom surface. In some implementations, each survey receiver has to reach the water bottom surface to within approximately 50 meters of the survey receiver's planned or target position. The actual location of each survey receiver has to be confirmed to be within 50 meters of its planned position before the next survey receiver can be deployed. The drop rate for survey receivers can be approximately half an hour per kilometer. In a deep marine surveying application, where the water depth can be several kilometers, it can take hours to drop each survey receiver to the water bottom surface.

After the survey receiver reaches the water bottom surface, the position of the survey receiver is typically confirmed by using an acoustic ranging system, such as an ultra-short baseline (USBL) system. The USBL system includes a USBL transceiver located at the marine vessel (such as at the bottom of the marine vessel) and a transponder on each survey receiver that is to be ranged. To obtain an unbiased estimate of the position of each survey receiver, measurements are typically made from several different angles to assure that the acoustically-determined distances are not biased (too long or too short). The process of waiting for each survey receiver to reach the water bottom surface and then estimating the position of the survey receiver with adequate geometry (at several different angles) can involve a substantial amount of time. If the survey arrangement includes a large number of survey receivers (hundreds or thousands), then the deployment of survey receivers can be very time consuming and costly.

SUMMARY

In general, a method of determining a position of a survey receiver used to collect measurements associated with a subterranean structure includes acquiring measurement information from multiple different types of measurement devices. The multiple different types of measurement devices can include an acoustic ranging system and an inertial system.

Other or alternative features will become apparent from the following description, from the drawings, and from the claims.

DETAILED DESCRIPTION

Figure 1:
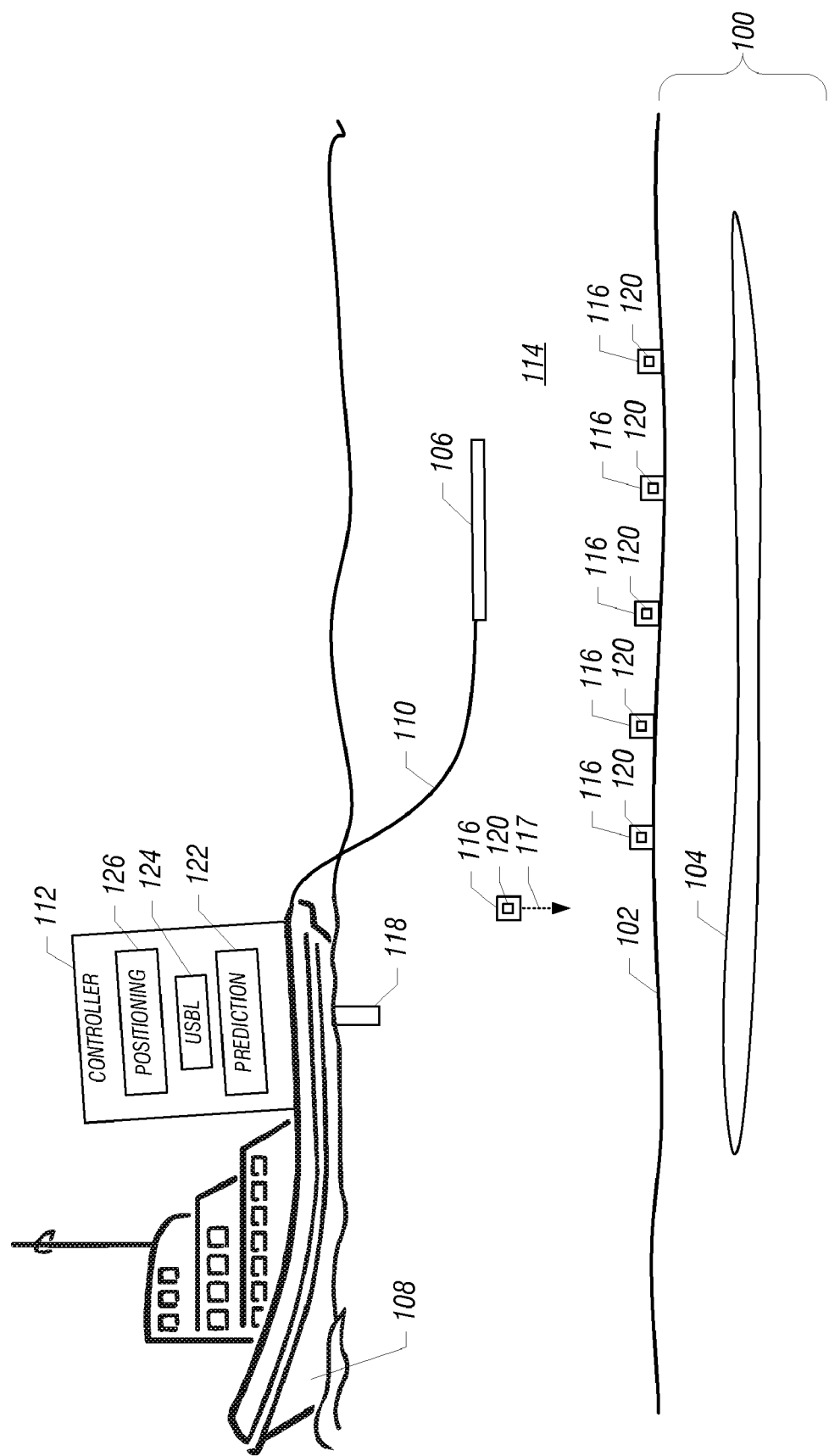
FIG. 1 illustrates an exemplary marine survey arrangement in which an embodiment of determining positions of survey receivers can be incorporated.

In the following description, numerous details are set forth to provide an understanding of the present invention. However, it will be understood by those skilled in the art that the present invention may be practiced without these details and that numerous variations or modifications from the described embodiments are possible.

In accordance with some embodiments, a technique or mechanism of determining a position of a survey receiver in a body of water involves collecting measurements from multiple different types of measurement devices, and computing the position of the survey receiver based on the measurement information from the multiple different types of measurement devices. The survey receiver is a receiver used to measure a response of a subterranean structure to a survey signal. The survey receiver can be an electromagnetic (EM) receiver or a seismic receiver, and the survey signal can be an EM signal generated by a controlled EM source (for controlled-source electromagnetic (CSEM) surveying), or that is naturally occurring (for magnetotelluric surveying). Alternatively, the survey signal can be a seismic signal generated by a seismic source.

In one embodiment, the multiple different types of measurement devices include (1) an acoustic ranging system, and (2) an inertial measurement system (which includes sensors to measure acceleration, compass heading, orientation, and so forth). In one embodiment, the acoustic ranging system that is used is an ultra-short baseline (USBL) acoustic ranging system. A USBL ranging system includes a USBL transceiver that is mounted underneath a marine vessel, and a transponder at an object (survey receiver) that is to be ranged.

The inertial measurement system includes gyroscopes, accelerometers, and a compass. The accelerometers are used for measuring acceleration of the survey receiver, and the gyroscopes are used for determining the orientation of the survey receiver. There can be three accelerometers to detect acceleration in the three spatial directions (the orthogonal X, Y, and Z directions), and three gyroscopes for measuring the survey receiver orientation in the X, Y, and Z directions. The compass is used for measuring a compass heading of the survey receiver and may be a gyrocompass or magnetic compass.

Vertical rotations can also be determined by tiltmeters. The modern electronic tiltmeter, which is replacing all other forms of tiltmeters, uses a simple bubble-level principle, as used in the common carpenter leveler. An arrangement of electrodes senses the exact position of the bubble in the electrolytic solution, to a high degree of precision. Any small changes in the level are recorded using a standard data logger. This arrangement is quite insensitive to temperature, and can be fully compensated, using built-in thermal electronics. A newer technology uses MEMS electronics.

In a ranging operation of the USBL ranging system, a first acoustic pulse is transmitted by the USBL transceiver that is detected by the transponder. The transponder replies with the transponder's own acoustic pulse. The reply pulse is detected by the transceiver, and the time between the transmission of the first acoustic pulse from the USBL transceiver and receipt of the reply pulse is measured by the USBL ranging system. The time is used to calculate the range (distance) between the transceiver and the transponder. The USBL transceiver also includes multiple (e.g., three or more transducers) that are spaced apart to provide a transducer array. A phase-differencing technique can then be used to determine the phase differences of signals received by the different transducers in the array to calculate the angle from each transducer to the transponder. Based on triangulation, the USBL system can then determine two bearings to the transponder relative to the transceiver. In addition, the vertical position can be constrained by a depth sensor in the transponder.

Another embodiment of the USBL technique is to use two transceivers in the positioning operation. One transceiver on the vessel determines coordinates of the other transceiver located on a towed body closer to the sea floor. Acoustic signals transmitted from the towed body travel shorter distances to reach the receivers being deployed. In addition, the lower noise environment on the towed body gives better signal-to-noise performance for the transceiver when compared to the noisier vessel-mounted transceiver. One such system that accommodates this mode of operation is the iUSBL from Sonardyne, Model No. 8091, With knowledge of the USBL transceiver on the towed positioning unit, which may be the same platform used to tow the CSEM source, the positions of the EM receivers can be determined as they fall through the water column. A slight variation of this technique is to locate a transponder on or near the vessel and position this relative to a towfish transceiver. In either case, the position of the transceiver or transponder near or on the vessel hull is determined relative to an absolute reference frame by applying yaw, pitch and roll corrected offsets relative to the vessel GNSS antenna. Such a technique is described in U.S. Ser. No. 12/126,894, filed 05/25/2008, U.S. Patent Publication No. 2009/0290447, for determining the source antenna orientation.

In yet another embodiment, the USBL transceiver may be mounted on a separate towed platform on the sea surface. This platform also has the advantage of lower noise as compared to the vessel since it has no propulsion related noise or vibrations. Such a system is described in U.S. Patent Publication No. 2008/0048881.

In the embodiments described above, the acoustically determined trajectory and final position of a survey receiver is improved by combining this information with measurements made on the receiver platform as described above.

In accordance with some embodiments, to further enhance accuracy of determining a position of a survey receiver in the body of water, position prediction software can be used to model the fall of a survey receiver in the body of water based on a predefined model, such as a numerical model. The position prediction software can start with an initial model to predict the trajectory of the survey receiver in the body of water. Initially, the position prediction software may predict a first trajectory. However, as measurement data is received from the different types of measurement devices as the survey receiver descends in the body of water, the position prediction software can adjust the predicted trajectory. Based on the trajectory, the position prediction software can predict the position of the survey receiver upon reaching the water bottom surface. This output of the position prediction software can be combined with the measurement information of the different types of measurement devices to produce a more accurate position of the survey receiver at the water bottom surface. An example of predictive algorithms is described in Peter Chu et al., "Underwater Bomb Trajectory Prediction for Stand-off Assault (Mine/IED) Breaching Weapon Fuse Improvement (SOABWFI), pp. 1-10 (2008).

Note that according to some embodiments, the position of the survey receiver is continually tracked as the survey receiver falls in the body of water, until the survey receiver reaches the water bottom surface. At that point, the position-determining system is able to accurately determine the position of the survey receiver at the water bottom surface. As a result, the operator of the marine survey does not have to wait for the survey receiver to reach the water bottom surface before starting positioning operations, and the operator would not have to make measurements from different angles to assure proper positioning of the survey receiver. This can save a substantial amount of time in verifying that each survey receiver is within a predefined distance of its planned or target position. If the marine survey includes hundreds or thousands of survey receivers, then the time savings can be substantial.

FIG. 1 illustrates an exemplary arrangement for performing a survey of a subterranean structure in a marine environment. As depicted in FIG. 1, surveying is performed of a subterranean structure 100 that is located below a water bottom surface 102 (e.g. sea floor). The subterranean structure 100 includes one or more subterranean elements 104 of interest, where the one or more subterranean elements can include a hydrocarbon-bearing reservoir, gas injection zone, freshwater aquifer, or other elements of interest.

During a survey operation, a survey source 106 (EM transmitter or seismic source) is towed by a marine vessel 108 by a tow cable 110. A controller 112 on the marine vessel can send control signals to the survey source 106 to activate the survey source 106 to emit survey signals that are propagated through a body of water 114 into the subterranean structure 100.

A line or array of survey receivers 116 are provided on the water bottom surface 102, where the survey receivers 116 are able to detect signals affected by the subterranean structure 100. The survey receivers 116 include sensing elements for sensing magnetic and/or electric fields or seismic waves.

At some point, survey data collected by the survey receivers 116 are communicated to the controller 112 on the marine vessel 108 (or a remotely located controller).

Before the survey operation discussed above can be performed, the survey receivers 116 have to be first deployed on the water bottom surface 102. During deployment, the survey source 106 does not have to be deployed in the body of water 114.

As shown in FIG. 1, one of the survey receivers 116 is depicted as falling in the body of water 114 in the direction indicated generally by dashed arrow 117. This survey receiver 116 was dropped from the marine vessel 108 into the body of water 116, with the expectation that the survey receiver 116 reaches a planned or target position on the water bottom surface 102.

To confirm that the survey receiver 116 has in fact reached the water bottom surface 102 within a predefined distance (e.g. 50 meters) of the target position on the water bottom surface 102, various different types of measurement devices, as well as prediction software 122 in the controller 112 of FIG. 1, can be used to make that determination. As mentioned above, one type of measurement device used is an acoustic ranging system, such as a USBL system, which includes a transceiver 118 provided on a pole below the marine vessel 108. Alternatively, the USBL transceiver 118 can be mounted with the survey source 106.

Each survey receiver 116 has a respective transponder 120 that is to be used in conjunction with the transceiver 118. As discussed above, the transceiver 118 generates an acoustic pulse that is sent to the transponder 120 of a descending survey receiver 116. Upon receipt of the acoustic pulse from the transceiver 118, the transponder 120 responds by sending a reply acoustic pulse back to the transceiver 118. The time between transmission of the initial acoustic pulse and receipt of the reply acoustic pulse from the transponder 120 at the transceiver 118 determines the range (distance) between the transceiver 118 and the transponder 120 of the descending survey receiver 116. Moreover, as discussed above, the transceiver 118 includes an array of transducers that are spaced apart to enable an angle between each transducer and the transponder 120 to be determined, such that the bearing of the transponder 120 relative to the transceiver 118 can be determined.

The received information at the transceiver 118 is provided to USBL logic 124 in the controller 112. The USBL logic 124 can be in the form of software executable in the controller 112. The USBL logic 124 analyzes the information provided by the transceiver 118 to determine the distance between the transceiver 118 and the transponder 120, as well as to determine the bearing of the transponder 120 relative to the transceiver 118.

Alternatively, the transceiver 118 can also be on the source 106, and another transceiver on the vessel hull, or as yet another alternative, a transponder 120 can be located on or near the vessel. Such devices can be either fixed to the vessel hull or mounted on a pole alongside and rigidly fixed to the vessel. The towed body represented by 106 can be a source towfish, a platform dedicated to positioning during deployment, or both. It may be easier to deploy and control a towed platform dedicated to positioning and after the deployment is finished retrieve this platform, fit it with a source antenna and redeploy it for the EM measurements. Alternatively it may be more efficient to have two separate platforms, one dedicated to positioning that is easy to deploy.

An issue associated with acoustic ranging is that the exact velocity of the acoustic signals in different layers of the body of water may not be exactly known. Note that different layers in the body of water can have different temperatures and different salinities, which can vary the velocity of sound in the respective layers. Consequently, due to such variations, the ranging and positioning performed using the USBL ranging system may not be entirely accurate.

To address the above issue, measurement information is collected from another type of measurement device to help reduce the error due to not knowing exactly the sound velocities in different water layers. One such other type of measurement device can be an inertial measurement system that includes sensors provided in each survey receiver to measure movement of the survey receiver.

Figure 2:
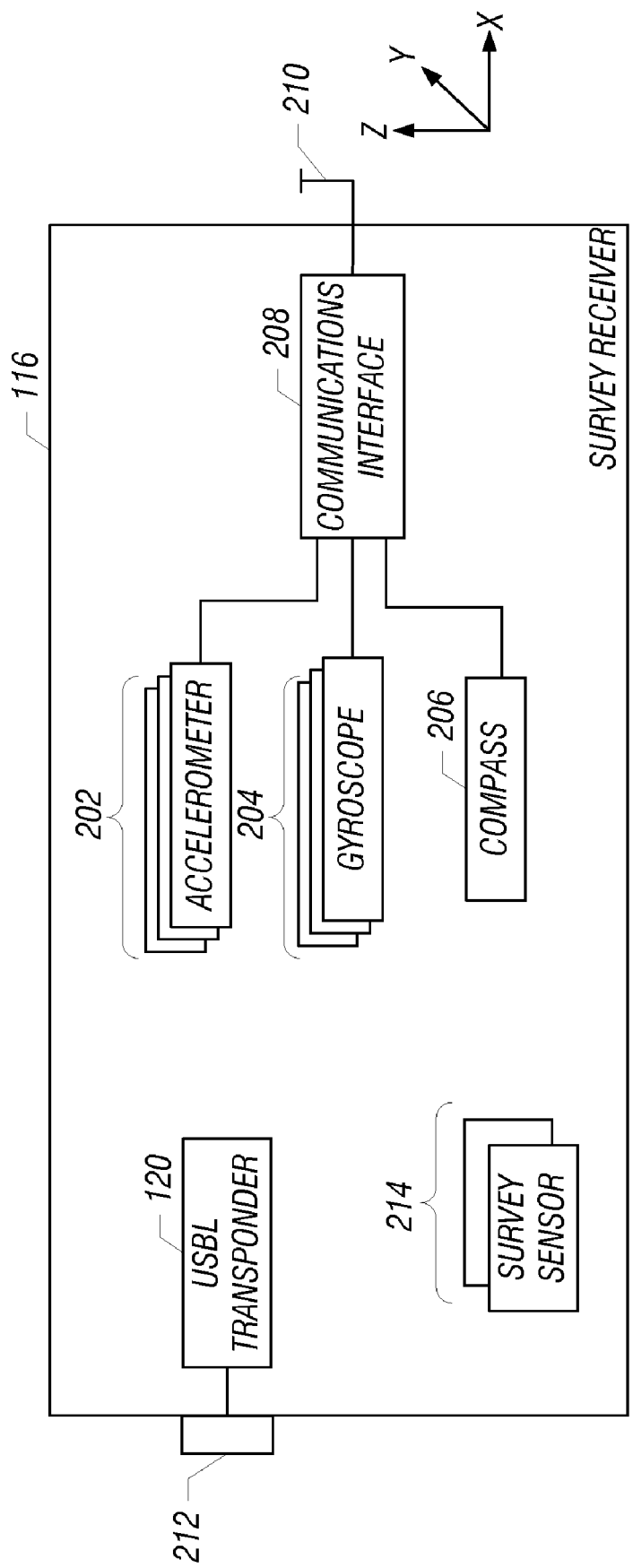
FIG. 2 is a block diagram of a survey receiver according to an embodiment.

As depicted in FIG. 2, the sensors of such an inertial measurement system include accelerometers 202, gyroscopes 204, and a compass 206 provided inside the survey receiver 116. The accelerometers 202 are used for measuring acceleration of the survey receiver 116 in each of the X, Y, and Z directions in a three-dimensional space. The gyroscopes 204 are used for determining the orientation of the survey receiver 116 with respect to the X, Y, and Z direction, and the compass 206 is used for determining the position of the survey receiver 116 relative to magnetic north.

The accelerometers 202, gyroscopes 204, and compass 206 are connected to a communications interface 208, which in turn is connected to a transmission element 210 to wirelessly transmit signals containing measurement information collected by the accelerometers 202, gyroscopes 204, and compass 206. In one example, the transmission element 210 can be an acoustic transmission element to transmit acoustic signals. Alternatively, the transmission element 210 can transmit other types of wireless signals, such as radio frequency (RF) signals, light pulses, and so forth. The wireless signals sent by the transmission element 210 are received by a receiving element and the marine vessel 108. The measurement information contained in the received signals are provided to the controller 112.

As further depicted in FIG. 2, the USBL transponder 120 in the survey receiver 116 is connected to an acoustic transceiver element 212 to transmit and receive acoustic signals when performing USBL ranging.

In addition to the various sensors (accelerometers 202, gyroscopes 204, compass 206, and USBL transponder 120) that are used for determining positioning of the survey receiver 116, the survey receiver 116 also includes survey sensors 214 that are used to measure responses of the subterranean structure to survey signals (EM signals or seismic signals). The survey sensors 214, in the EM context, can measure magnetic and/or electric fields. In the seismic context, the survey sensors 214 are used to measure seismic waves reflected from the subterranean structure.

Positioning software 126 in the controller 112 receives the various measurement information from the accelerometers 202, gyroscopes 204, and compass 206, and combines that measurement information with the information received from the USBL logic 124 to more precisely determine the position of the survey receiver 116. In accordance with some embodiments, the positioning software 126 also takes into account output of the prediction software 122 that is used for predicting the position of the survey receiver 116 as it descends through the body of water 114.

Figure 3:
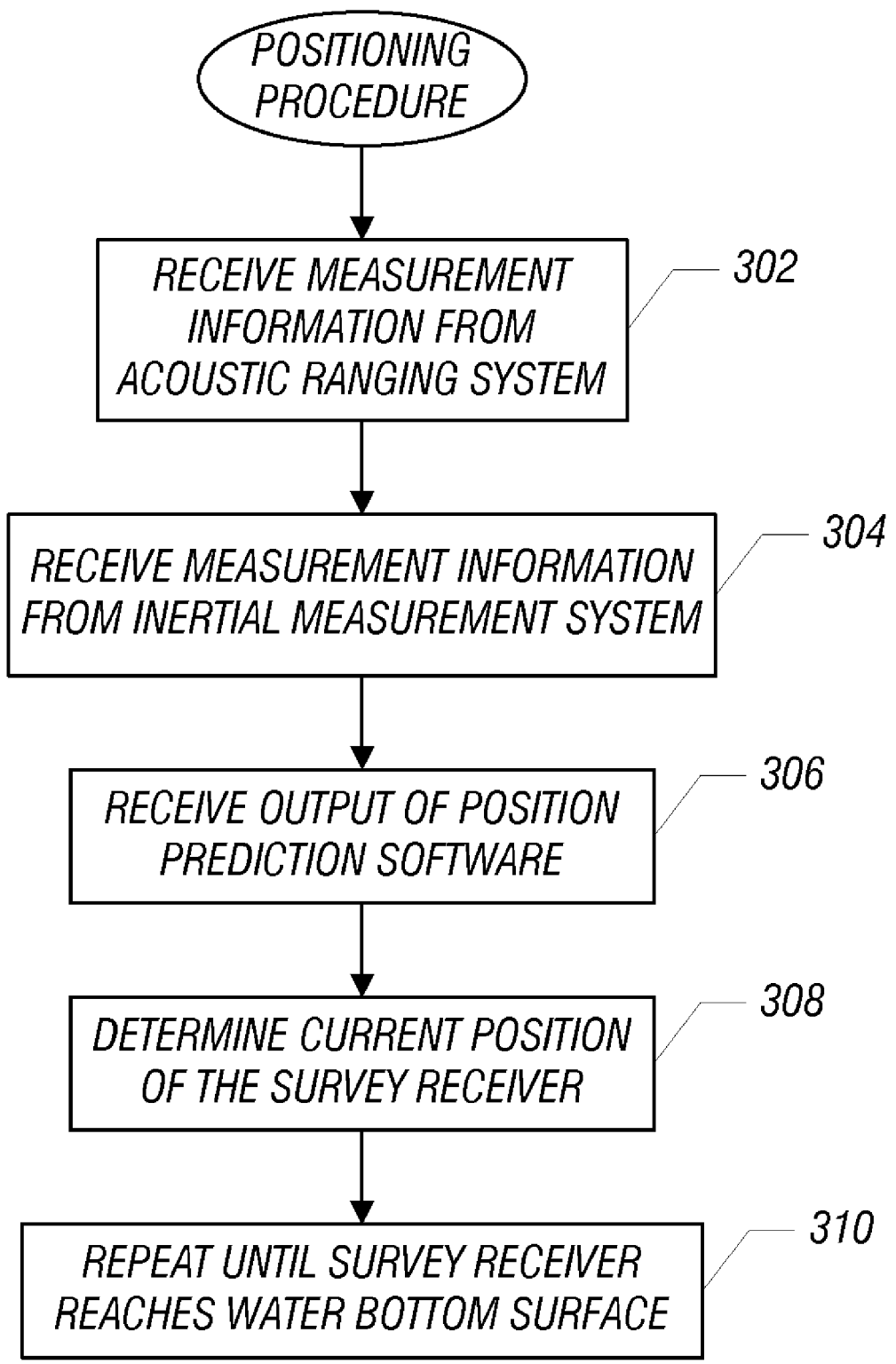
FIG. 3 is a flow diagram of a process of accurately determining a position of a survey receiver, in accordance with an embodiment.

FIG. 3 shows a positioning procedure that is performed by the positioning software 126 of FIG. 1. The positioning software 126 receives (at 302) measurement information from the acoustic ranging system including the USBL logic 124. Furthermore, the positioning software 126 receives (at 304) measurement information from the inertial measurement system, including accelerometers 202, gyroscopes 204, and the compass 206 in the survey receiver 116, as depicted in FIG. 2.

The positioning software 126 can use a Kalman filter to estimate the position of the survey receiver based on the measurement information from the different types of measurement devices. The Kalman filter is a recursive estimator in that the Kalman filter updates its estimate based on current measurement information and a previous estimate provided by the Kalman filter. The most basic combining process is simply to combine coordinates determined by the predictive model, an acoustic coordinate determination system such as USBL, and the coordinates determined by the inertial measurement unit as a weighted mean. The relative weighting of the coordinate inputs can be based on error propagation of measurement errors to the coordinate domain. Besides the coordinate estimate states in the Kalman filter, it is common to include velocity states in X, Y and Z that predict the trajectory over time. These states are updated with coordinates determined by actual measurement data whenever such data becomes available. Other Kalman filters have the error states of the inertial measurement units (IMUs) as unknowns and these are recursively estimated as other types of measurements are available. The error states are then used to correct the outputs of the IMU.

In addition, the positioning software 126 receives (at 306) the output of position prediction software 122. Based on the received measurement information from the acoustic ranging system, inertial measurement system, and output of the position prediction software, the current position of the survey receiver is determined (at 308). Note that the survey receiver whose position is being determined may still be descending in the body of water. Thus, the positioning procedure is continually repeated (at 310) until the survey receiver reaches the water bottom surface. "Continually" repeating the positioning procedure refers to repeating the procedure multiple times during the descent of the survey receiver. Note that the output produced by the position prediction software 122 can be continually updated as additional information is received by the prediction software 122 from the acoustic ranging system and/or inertial measurement system.

Using outputs from different types of sources regarding the position of the survey receiver, the positioning software 126 is able to more accurately determine the final position of the survey receiver when it reaches the water bottom surface 102.

Figure 4:
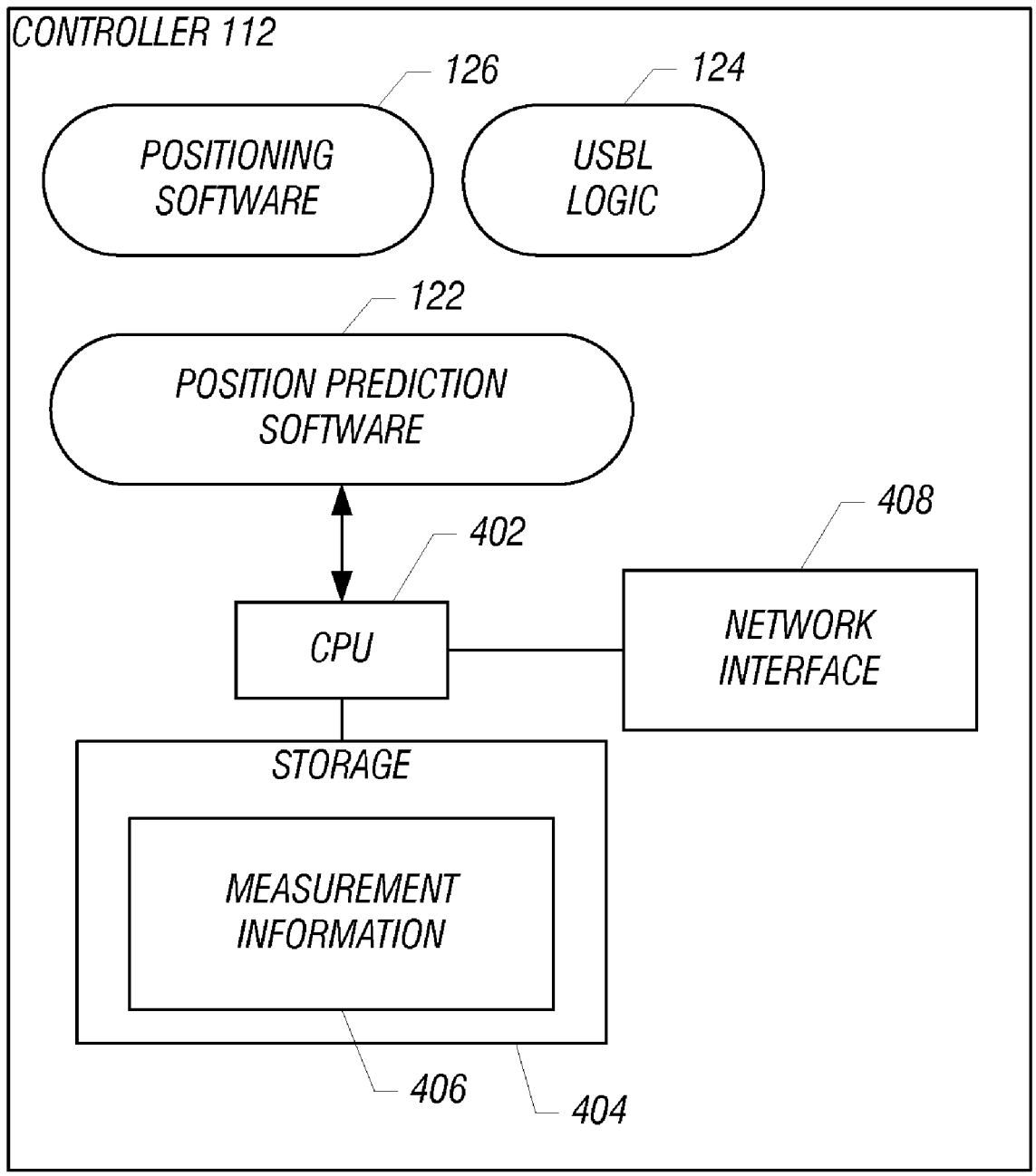
FIG. 4 is a block diagram of a controller that is able to perform the process of FIG. 3 according to an embodiment.

FIG. 4 illustrates components of the controller 112 according to an example. The controller 112 includes the positioning software 126, USBL logic 124, and positioning prediction software 122, which are executable on one or more central processing units (CPUs) 402. The CPU(s) 402 is (are) connected to a storage 404, which stores measurement information 406 received from the acoustic ranging system and inertial measurement system.

The measurement information 406 can be received through a network interface 408. The controller 112 can be connected to a network to allow the controller 112 to receive information collected by the acoustic ranging system and by the inertial measurement system.

Inertial or other measurement data measured at the receiver as it descends in the water column and finally rests on the sea floor can be acoustically transmitted to either a receiver on the submerged towfish, a surface towed platform, or directly to the vessel. An alternative method to retrieve the final coordinates from the deployed EM receiver is by either AUV or ROV that visit the deployed receivers. Another alternative is not to rely on the coordinates determined by the deployment method for final coordinates but only as a rough estimate to determine if the position is in specifications, (e.g., 50 meters of a target coordinate) and make additional positioning measurements during the actual EM data acquisition operation.

Instructions of software described above (including prediction software 122, USBL logic 124, and positioning software 126 of FIG. 4) are loaded for execution on a processor (such as one or more CPUs 402 in FIG. 4). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method of determining a position of a survey receiver used to measure a response of a subterranean structure to a survey signal, comprising:
    receiving, from an acoustic ranging system, coordinates corresponding to plural positions of the survey receiver as the survey receiver descends in a body of water to a surface;
    receiving, from at least one sensor, measurement information associated with movement of the survey receiver; and
    computing, based on the coordinates from the acoustic ranging system and the measurement information from the at least one sensor, a trajectory of the survey receiver through the body of water and the position of the survey receiver at the surface once the survey receiver has reached the surface.

2. The method of claim 1, wherein receiving the measurement information from the at least one sensor comprises receiving the measurement information from at least one accelerometer.

3. The method of claim 2, wherein receiving the measurement information from the at least one sensor further comprises receiving the measurement information from at least one gyroscope.

4. The method of claim 3, wherein receiving the measurement information from the at least one sensor further comprises receiving the measurement information from a compass.

5. The method of claim 3, wherein receiving the measurement information from the at least one sensor further comprises receiving the measurement information from a leveler.

6. The method of claim 1, wherein receiving the measurement information from the at least one sensor comprises receiving the measurement information from the at least one sensor that is provided with the survey receiver.

7. The method of claim 1, further comprising repeating the receiving and computing steps as the survey receiver descends in the body of water.

8. A method of determining a position of a survey receiver used to measure a response of a subterranean structure to a survey signal, comprising:
    receiving, from an acoustic ranging system, positions of the survey receiver as the survey receiver descends in a body of water to a surface;

receiving, from at least one sensor, measurement information associated with movement of the survey receiver;

computing, based on measurement information from the acoustic ranging system and the at least one sensor, the position of the survey receiver at the surface once the survey receiver has reached the surface; and using prediction software to predict a trajectory of the survey receiver in the body of water, wherein computing the position of the survey receiver is further based on output of the prediction software.

9. The method of claim 8, further comprising:

the prediction software using a model to compute the predicted trajectory; and the prediction software using the measurement information from the acoustic ranging system and the at least one sensor to update the predicted trajectory of the survey receiver as the survey receiver descends in the body of water.

10. A system comprising:

a plurality of different types of measurement devices to measure a position of a survey receiver in a body of water, wherein the survey receiver is used to measure a response of a subterranean structure to a survey signal;

a processor; and position prediction software executable on the processor to predict a trajectory of the survey receiver descending through the body of water, wherein the processor is to:

combine the measurement information from the plurality of different types of measurement devices and to use an output of the position prediction software to determine a position of the survey receiver once the survey receiver reaches a water bottom surface.

11. The system of claim 10, wherein the plurality of different types of measurement devices include:

an acoustic ranging system; and an inertial measurement system.

12. The system of claim 11, wherein the acoustic ranging system includes a transceiver located at a marine vessel, and a transponder at the survey receiver, wherein acoustic signals are exchanged between the transceiver and transponder to establish a range between the transceiver and the transponder.

13. The system of claim 11, wherein the inertial measurement system includes at least one accelerometer.

14. The system of claim 13, wherein the inertial measurement system further includes at least one gyroscope.

15. The system of claim 14, wherein the inertial measurement system further includes a compass.

16. The system of claim 15, wherein the accelerometer, gyroscope, and compass are provided with the survey receiver, and wherein the survey receiver further includes a communications element to wireles sly transmit measurement information collected by the accelerometer, gyroscope, and compass to enable the measurement information to be received by the processor.

17. The system of claim 10, wherein the survey receiver comprises one of an electromagnetic receiver and a seismic receiver.

18. An article comprising at least one computer-readable storage medium containing instructions that when executed cause a processor to:

receive, from an acoustic ranging system, positions of a survey receiver as the survey receiver descends in a body of water to a surface;

receive, from at least one sensor, measurement information associated with movement of the survey receiver;

execute a position prediction software to predict a trajectory of the survey receiver through the body of water; and compute, based on measurement information from the acoustic ranging system and the at least one sensor and further based on the predicted trajectory from the position prediction software, a position of the survey receiver at the surface once the survey receiver has reached the surface.

19. The article of claim 18, wherein the at least one sensor is part of an inertial measurement system that includes accelerometers, gyroscopes, and a compass.

* * * * *